UNITED STATES PATENT OFFICE.

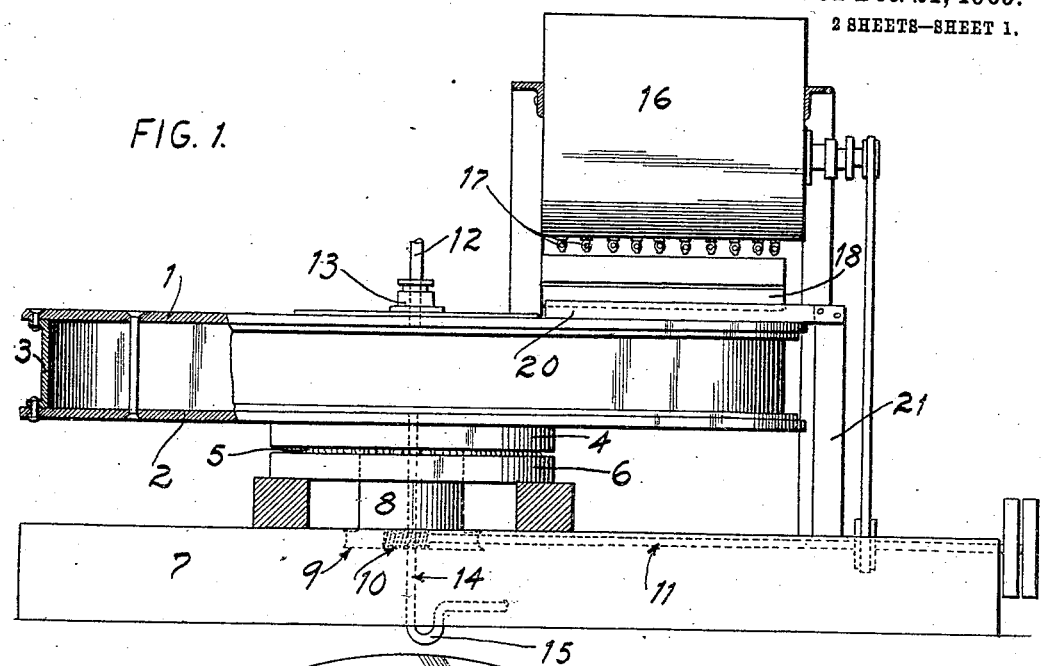
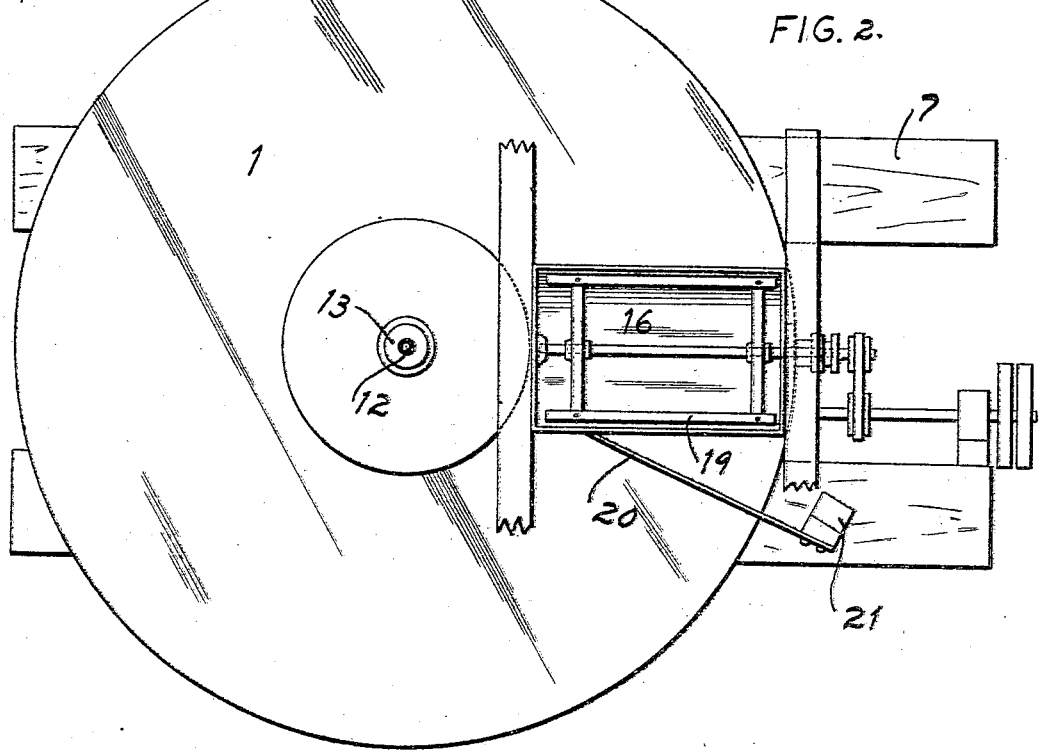

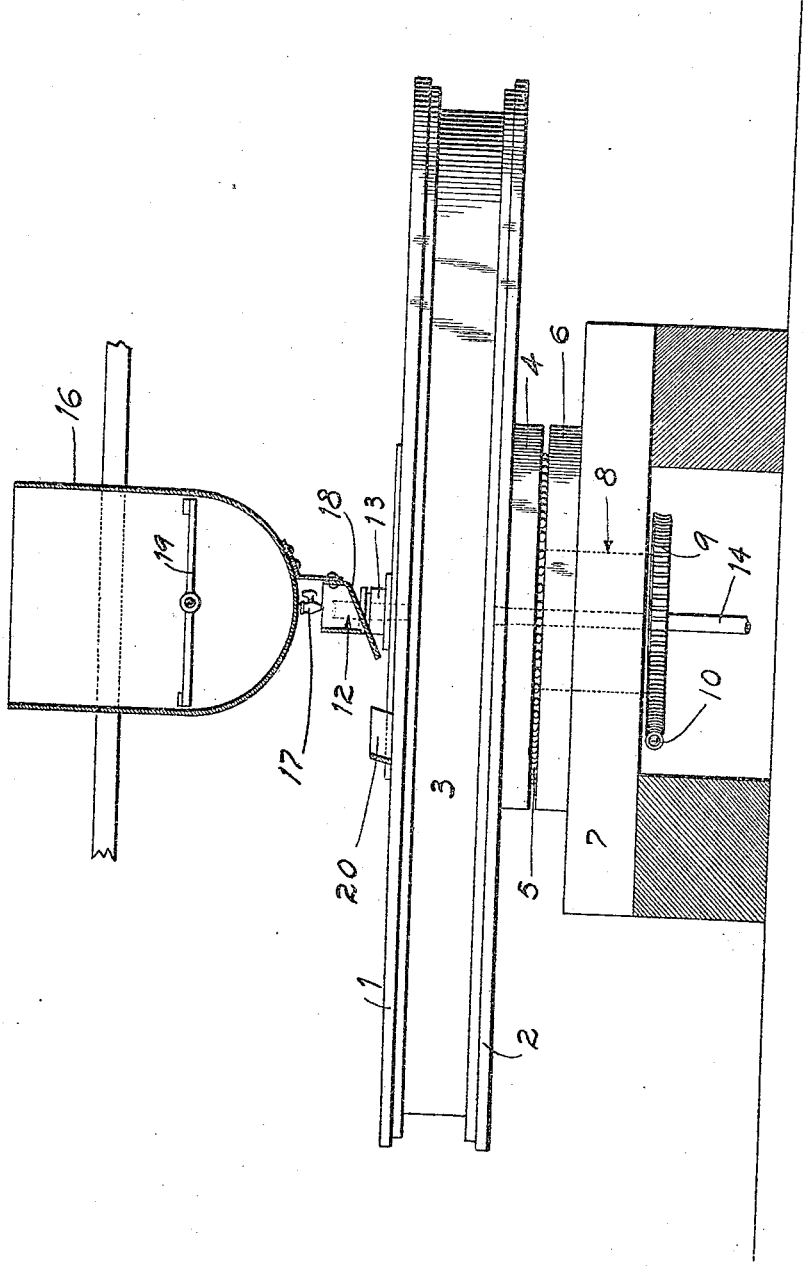

JOHN P. MARSHALL, OF ST. LOUIS, MISSOURI, ASSIGNOR OF ONE-HALF TO F. H. LUDINGTON, OF ST. LOUIS, MISSOURI.

DRYING-MACHINE.

943,691.   Specification of Letters Patent.   Patented Dec. 21, 1909.

Application filed April 20, 1909. Serial No. 491,036.

*To all whom it may concern:*

Be it known that I, JOHN P. MARSHALL, a citizen of the United States, residing at St. Louis, Missouri, have invented a certain new and useful Improvement in Drying-Machines, of which the following is a full, clear, and exact description, such as will enable others skilled in the art to which it appertains to make and use the same, reference being had to the accompanying drawings, forming part of this specification, in which—

Figure 1 is an elevation of a drying machine of my improved construction. Fig. 2 is a plan view of the machine. Fig. 3 is an elevation of the machine, showing the feeding hopper in section.

My invention relates to a machine for drying various materials which are mixed with water or other liquids, said machine being particularly intended for use in drying white lead, barytes, whiting, clay, and like substances.

My invention consists of a hollow disk arranged to rotate in a horizontal plane; means for rotating said disk at a fixed rate of speed; means for heating said disk; means for evenly feeding the material on the top surface of the disk; and means for scraping and removing the dried material from said disk.

My invention further consists in certain features of novelty hereinafter more fully described and claimed.

Referring by numerals to the accompanying drawings, 1 and 2 indicate respectively the top and bottom plates of the disk, which plates are preferably formed of metal. Uniting the edges of said plates is a vertically disposed wall or ring 3, and the joints between said ring and the plates 1 and 2 are made practically air and water-tight in order to prevent the leakage of the fluid used as a heating medium.

Fixed on the underside of the plate 2 is a bearing ring 4 which rests upon a series of balls 5, which latter are carried by a fixed bearing ring 6 supported by a suitable base 7. Formed integral with, and dependent from the central portion of the ring 4 is a short shaft 8 on the lower end of which is fixed a worm wheel 9 and engaging the teeth thereof is a worm 10 carried by a shaft 11, which latter is driven in any suitable manner.

12 designates a pipe which conveys the fluid heating medium to the interior of the hollow disk, said pipe extending through a suitable stuffing box 13 located at the center of the plate 1. A discharge pipe 14 leads downward from the center of the plate 2 through the shaft 8, there being a suitable stuffing box between said pipe and the plate 2, said pipe leading to a trap 15.

Supported in any suitable manner above the hollow disk and to one side of the center thereof, is a hopper 16 in which the material to be dried is placed, and arranged in the bottom of said hopper is a series of outlets preferably in the form of valves or petcocks 17. Positioned immediately below these outlets is an inclined spreader-plate 18, the lower end of which terminates immediately above the surface of the plate 1, from which spreader-plate the material discharges onto the surface of the hollow disk.

19 designates an agitator which is arranged in the hopper 16 for the purpose of agitating the liquid material placed therein and said agitator is driven in any suitable manner.

20 designates a plate which performs the function of a scraper, said plate being held by a suitable support 21 in such a manner that its lower edge bears directly upon the top surface of the plate 1, said scraper plate being positioned adjacent the spreader-plate 18.

When my improved machine is in operation, steam, hot water or hot gas is delivered to the interior of the hollow disk through the pipe 12 and thus said disk is heated to the proper degree of temperature. The disk is slowly rotated by imparting rotary motion to the shaft 11 and as said disk rotates, the pet-cocks or valves 17 are opened, thus permitting the liquid material to be dried to discharge onto the spreader-plate 18 and said material passes from thence onto the top surface of the plate 1.

The water or other liquid which holds the pulverized material in suspension evaporates upon coming in contact with the heated plate 1, and the vapor or steam resulting from this evaporation may be drawn off in any suitable manner. The material on the surface of the plate 1 is carried around as the disk slowly rotates, and the material, now thoroughly dried, is finally scraped from the surface of said plate by the scraper 20, said material then passing into a hopper or other receptacle to be removed in any suitable manner.

The top plate 1 of my improved drier, while preferably made of steel or iron, may be made of copper, brass, aluminum, or any material suitable to the requirements of the material to be dried. The hollow disk is preferably heated by means of steam or hot water, although it will be readily understood that the heating medium may be hot air or gas, and in some instances the disk or the top plate thereof may be electrically heated.

By utilizing a rotating disk and operating the same in a horizontal position, the material placed on the surface of the disk to be dried will not run and fall off, as is the case where the material is fed on to the surface of a rotating cylinder. The disk can be rotated at various speeds, depending upon the degree of heat maintained within the disk and according to the kind of material being dried, and as the disk is mounted upon ball-bearings it can be rotated with a minimum amount of friction and consequently with an expenditure of little power.

If desired, the plates 1 and 2 may be united by suitable stay-bolts, as shown in Fig. 1, so as to withstand the steam or other pressure necessary to heat the disk properly.

I claim:

1. In a machine of the class described, a drying disk comprising a pair of solid parallel plates spaced apart, a wall uniting the edges of said plates, means whereby said drying disk is rotated, an inlet pipe leading through the top plate and a discharge pipe leading from the chamber between said plates through the bottom plate.

2. In a machine of the class described, a drying disk comprising a pair of solid parallel plates spaced apart, a wall uniting the edges of said plates, an inlet pipe leading through the top plate and a discharge pipe leading from the chamber between said plates through the bottom plate, and means whereby said disk is rotated.

3. In a machine of the class described, a drying disk comprising a pair of solid parallel plates spaced apart, a wall uniting the edges of said plates, an inlet pipe leading through the top plate and a discharge pipe leading from the chamber between said plates through the bottom plate, means whereby said disk is rotated, and means whereby the material to be dried is fed onto the surface of the top plate of the disk.

4. In a machine of the class described, a drying disk comprising a pair of solid parallel plates spaced apart, a wall uniting the edges of said plates, an inlet pipe leading through the top plate and a discharge pipe leading from the chamber between said plates through the bottom plate, means whereby said disk is rotated, means whereby the material to be dried is fed onto the surface of the top plate of the disk, and means whereby the dried material is removed from the surface of the top plate.

5. In a machine of the class described, a hollow disk, means whereby fluid-heating medium is delivered to the chamber within said disk, a bearing ring carried by the underside of said disk, a fixed bearing ring, and a series of anti-friction members interposed between the bearing rings.

6. In a machine of the class described, a hollow disk, means whereby fluid-heating medium is delivered to the chamber within said disk, a bearing ring carried by the underside of said disk, a fixed bearing ring, a series of anti-friction members interposed between the bearing rings, and means whereby said disk is rotated.

7. In a machine of the class described, a drying disk, comprising a pair of solid plates spaced apart, a wall uniting the edges of said plates, a bearing ring on the underside of the bottom plate, a fixed bearing ring and a series of anti-friction members arranged between said rings.

8. In a machine of the class described, a drying disk, comprising a pair of solid plates spaced apart, a wall uniting the edges of said plates, a bearing ring on the underside of the bottom plate, a fixed bearing ring, a series of anti-friction members arranged between said rings, and means whereby said disk is rotated.

9. In a machine of the class described, a drying disk, comprising a pair of solid plates spaced apart, a wall uniting the edges of said plates, a bearing ring on the underside of the bottom plate, a fixed bearing ring, a series of anti-friction members arranged between said rings, and means whereby fluid-heating medium is delivered to the chamber within the disk.

10. In a machine of the class described, a drying disk, comprising a pair of solid plates, spaced apart, a wall uniting the edges of said plates, a bearing ring on the underside of the bottom plate, a fixed bearing ring, a series of anti-friction members arranged between said rings, and means whereby fluid-heating medium is delivered to the chamber within the disk.

In testimony whereof I hereunto affix my signature in the presence of two witnesses, this 17th day of April, 1909.

JOHN P. MARSHALL.

Witnesses:
ALMA GEBHART,
LENORE CLARK.